United States Patent [19]

Laakmann

[11] Patent Number: 5,436,926
[45] Date of Patent: Jul. 25, 1995

[54] MICRO GAS LASER WITH LASER ARRAY

[76] Inventor: Peter Laakmann, 11816 N. Creek Pkwy. No., Suite 103, Bothell, Wash. 98011-8205

[21] Appl. No.: 45,416

[22] Filed: Apr. 9, 1993

[51] Int. Cl.$^6$ .............................................. H01S 3/082
[52] U.S. Cl. ...................................... 372/97; 372/65; 372/87
[58] Field of Search .................. 372/61, 62, 65, 82, 372/87, 97

[56] References Cited

U.S. PATENT DOCUMENTS

| | | | |
|---|---|---|---|
| 4,719,639 | 1/1988 | Tulip . | |
| 4,719,640 | 1/1988 | Chenausky et al. | 372/82 |
| 4,751,715 | 6/1988 | Henderson | 372/82 |
| 4,807,232 | 2/1989 | Hart et al. | 372/82 |
| 4,908,585 | 3/1990 | Chenausky | 372/82 |
| 5,029,173 | 7/1991 | Seguin | 372/87 |
| 5,079,773 | 1/1992 | Hart et al. | 372/82 |

*Primary Examiner*—Rodney B. Bovernick
*Assistant Examiner*—Robert E. Wise
*Attorney, Agent, or Firm*—Seed and Berry

[57] ABSTRACT

A micro gas laser that provides a very high power to size or weight ratio by including a laser array featuring common optics and common discharge structures. The gas laser includes a laser housing enclosing a supply of laser gas and elongated first and second electrodes. The electrodes are parallel to each other and form a rectangular discharge section between them. Two elongated bore separators extend between the first and second electrodes to divide the discharge section into the three elongated resonator cavities. The bore separators are thin ceramic wafers that electrically isolate the resonator cavities from each other, but retain sufficient thermal conductivity to provide efficient diffusion cooling. The gas laser includes means to apply an electric field between the electrodes sufficient to create a laser beam in each of the three resonator cavities. In a preferred embodiment, the gas laser includes optical repositioning means located outside the resonator cavities to reconfigure the laser beam into a more closely space, triangular arrangement. The gas laser may further include a focusing element positioned to receive and focus the triangular arrangement of laser beam to a single focus spot or a cluster of foci.

21 Claims, 2 Drawing Sheets

MICRO GAS LASER WITH LASER ARRAY

TECHNICAL FIELD

This invention relates to lasers and, more particularly, to a micro gas laser with a laser array.

BACKGROUND OF THE INVENTION

Recent developments involving the use of laser technology in a variety of technical fields has created a corresponding need for improved laser systems. For example, a substantial amount of research has been conducted regarding the use of laser energy for medical purposes ranging from the treatment of dermatological conditions (described in U.S. Pat. No. 4,733,660) to the photocoagulation of blood vessels to control bleeding (described in U.S. Pat. No. 4,633,870 to Sauer). In particular, the medical use of laser technology has created a constant need for laser systems of compact size that have a high power to size/weight ratio.

For medical and other purposes, sealed gas lasers have been developed in which laser gas, such as carbon dioxide ($CO_2$) or carbon monoxide (CO), in a resonator cavity is excited by radio frequency (RF) energy from an external source. A conventional RF-excited gas laser employs a resonator cavity having a square or circular discharge cross section, n example of which is shown in U.S. Pat. No. 4,169,251, issued to Laakman, which is incorporated by reference herein. This type of system is capable of significant output power and gas life, while maintaining a relatively small physical size. Conventional RF-excited lasers typically deliver about 0.8 to 1 W per linear inch of discharge length. Lasers over about 30 W of power typically fold their laser beams one to three times to maintain a reasonable length laser.

More recently, a second type of RF-excited gas laser known as a slab laser has been developed and is described in U.S. Pat. No. 4,719,639 to Tulip. Slab lasers include a pair of cooled metal electrodes having highly reflective surfaces with an oblong rectangular resonator cavity between the surfaces. Slab lasers can deliver more power per discharge length than conventional RF-excited gas lasers by using an oblong rectangular discharge cross section.

It is well known in the art that laser output power is increased by increasing the length in which the laser beam propagates. Because power and length of the discharge tube are related, the conventional approach to producing a small laser uses a folded structure to increase the effective length of the discharge tube. This results in relatively complicated optics assemblies and difficult alignment, in addition to possibly more complex discharge structures. It has been the inventor's experience that folding relatively short discharge sections is very inefficient because of low gain per section and relatively high turnaround losses.

For many applications in the medical and engraving field a power of 10 to 15 Watts is sufficient. For these applications, the conventional square- or circular-bore RF-excited technology has been the mainstay. In these applications, the laser is usually hard mounted (i.e. not handheld) and the beam is delivered through optical fibers, articulating arms or moving mirrors.

Notwithstanding previous developments in the field of laser technology (especially with respect to RF-excited sealed gas lasers), a need remains for a laser system of greatly reduced size that is nonetheless capable of producing high output power levels without the use of complex, intricate optical sub-systems. This laser must be economical to produce and be rugged. This rules out the complex prior art slab laser technology that is thought to be more suitable for high-powered metal cutting lasers.

SUMMARY OF THE INVENTION

It is a principal object of the invention to create a small and ultra-lightweight laser.

Another object of the invention is to create a laser that can deliver over two watts per inch of power.

Another object of the invention is to create a discharge cavity capable of accepting over 20 watts per inch of RF power and still provide good diffusion cooling of the gas.

It is still a further object of the invention to provide a laser system that can provide a single focused spot of less than 0.004 inches from three parallel diffraction-limited beams.

It is yet another object of the invention to provide a cluster of focused spots within an area of 0.004 inch diameter.

In accordance with the foregoing objects, a preferred embodiment of the present invention includes a sealed gas laser that is miniature in size, yet is capable of producing unexpectedly high power output levels. The gas laser includes a laser housing enclosing a supply of laser gas and elongated first and second electrodes. The electrodes are parallel to each other and form a rectangular discharge section between them. One or more bore separators extend between the first and second electrodes to divide the discharge section into at least two resonator cavities. The gas laser includes means to apply an electric field between the electrodes sufficient to create a first laser beam in the first resonator cavity and a second laser beam in the second resonator cavity. Common resonator mirrors are employed for both laser beams.

In a preferred embodiment, the gas laser includes optical repositioning means located outside the resonator cavities to laterally displace the first laser beam closer to the second laser beam while directing the first laser beam substantially in the same direction as the laser beams were directed before the first laser beam was displaced. Preferably, the optical repositioning means includes a refractive element having parallel faces with an angle of incidence to the first laser beam other than zero degrees. The gas laser may further include a focusing element positioned to receive and focus the displaced first laser beam and the second laser beam.

DETAILED DESCRIPTION OF THE INVENTION

The present invention is directed to a gas laser that produces an array of laser beams rather than the single beam produced by prior art lasers. The laser array approach overcomes the problems of the prior art and provides a lightweight "pencil-length" laser capable of delivering 10 to 15 watts of power. Preferably, the laser array approach is used in combination with a beam reconfiguring arrangement of optical elements positioned outside a laser cavity that produces the laser array. It offers considerable promise and utility in a variety of different fields including the medical area where small, yet powerful laser units are of substantial importance.

Figure 1:
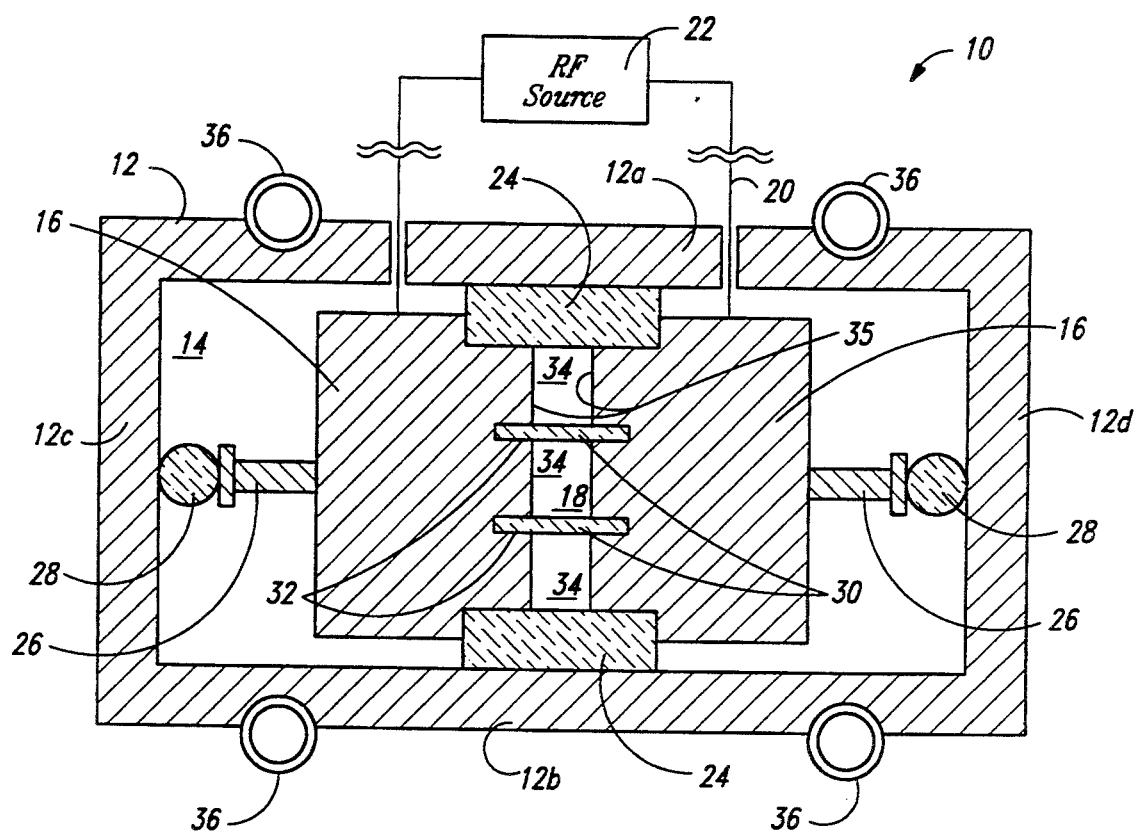
FIG. 1 is a cross-sectional view of a radio frequency-excited gas laser according to the present invention.

FIG. 1 shows a gas laser 10 constructed according to the present invention. The gas laser 10 includes a laser housing 12 enclosing a supply of laser gas 14. In a preferred embodiment, the laser housing is about 6-8 inches long and is composed of a durable, high thermal conductivity metal, such as aluminum. The preferred laser housing is rectangular in cross-section and has interior dimensions of approximately 0.5 inches by 1.5 inches and exterior dimensions of approximately 0.75 inches by 1.75 inches. The laser gas preferably includes carbon dioxide ($CO_2$), but other gases such as carbon monoxide (CO) may be employed. A laser gas mixture of 15% $CO_2$, 15% Nitrogen ($N_2$), 5% xenon, and 65% Helium filled to a pressure of 110 torr has been found to be desirable.

Positioned within the laser housing 12 are a pair of elongated electrodes 16 extending substantially the length of the laser housing. The electrodes are adjacent and spaced apart from each other to form a discharge gap 18 therebetween. The electrodes are preferably made of a relatively inert, thermally and electrically conductive material such as aluminum. The electrodes are preferably anodized in a conventional manner to obtain dielectric isolation in order to avoid abnormal localized discharges. The electrodes 16 are connected via a pair of conducting lines 20 to a radio frequency (RF) source 22, which, when actuated, supplies RF energy to the electrodes to excite the gas 14 in the discharge gap 18 and thereby create a laser beam therein. In a preferred embodiment, the RF source has an output power of approximately 120 watts and an operating frequency of approximately 40-82 MHz. As is known in the art, opposite phase RF voltage can be applied to the electrodes to prevent extraneous discharges by having a high potential only across the discharge gap 18.

The electrodes 16 are supported and separated away from the opposing two walls 12a and 12b of the laser housing 12 by a pair of insulating members 24. The insulating members preferably are of ceramic or other electrically insulating and thermally conducting material. The electrodes 16 are held in place within the laser housing 12 between the opposing two walls 12c and 12d against lateral movement by a pair of compression screws 26 and a pair of ceramic ball insulators 28.

In contrast to prior art lasers, the gas laser 10 of the preferred embodiment includes two elongated bore separators 30 extending across the space between the electrodes 16 substantially along their entire lengths. The bore separators are approximately 0.015 inch thick wafers, made of ceramic or other electrically insulating and thermally conducting material, that are positioned loosely in longitudinal slots 32 in the inwardly facing surfaces 35 of the electrodes. The bore separators divide the discharge gap 18 into three resonator cavities 34 that are approximately 0.08 inch square, with each resonator cavity having a center that is approximately 0.1 inches from the center of the adjacent resonator cavity or cavities. When RF energy is supplied to the electrodes as discussed above, a separate laser beam is formed in each of the three resonator cavities. It should be appreciated that the use of two bore separators is only exemplary; more or fewer bore separators may be employed as desired.

A constant problem encountered with lasers is the prevention of excess heat being built up in the lasers. The bore separators 30 assist in heat dispersion by providing additional surfaces that absorb some of the heat from the laser gas and transmit the heat to the electrodes 16. The electrodes pass the heat to the laser housing 12 via the insulating members 24. In the preferred embodiment, aluminum cooling tubes 36 filled with a cooling fluid, such as water, are embedded into the walls 12a and 12b of the laser housing 12 to disperse the heat from the laser housing. The cooling tubes extend substantially the entire length of the laser housing and are connected to each other to provide a cooling fluid circulation system as is known in the art. Preferably, thermal epoxy is used to affix the cooling tubes to the laser housing to minimize thermal resistance between the cooling tubes and the laser housing.

It has been found that the average temperature difference between cooling tubes 36 and bore separators 30 is less than 15° C. in the preferred embodiment. Throughout the design, temperature drop is minimized by having small clearances between mating parts and relying on gas conduction as known in the art. Surprisingly, the temperature drop along the bore separators is low enough, approximately 8° C., to offer effective cooling of the laser gas.

A first embodiment of the gas laser 10 shown in FIG. 2 includes optical elements used to amplify and redirect three laser beams 38 produced in the laser housing 12 as described in connection with FIG. 1. Positioned at one end of the laser housing is a flat, totally reflective (approximately 99.8% reflective) resonator mirror 40 and at an opposite end of the laser housing is a flat, partially reflective (approximately 95% reflective) resonator mirror 42. Each resonator mirror is large enough to reflect all of the laser beams back and forth within the laser housing to amplify the laser beams before they exit the partially reflective resonator mirror 42. Each resonator mirror is appropriately spaced (approximately 0.27 inches) from the correspondingly positioned end of the resonator cavities 34 to obtain optimum mode discrimination in order to resonate at a single, fundamental mode or frequency. Only one mirror on each end is required with an area large enough to cover the resonator cavities.

Immediately after exiting the partially reflective resonator mirror 42, the three laser beams 38 are arranged in a linear manner. The laser beams are directed through a beam refraction assembly 44, which displaces the center beam away from the two outside laser beams and then displaces the two outside laser beams closer together to form the three laser beams into a triangular arrangement when viewed along the axis of the laser housing 12, as shown in FIG. 3a and described in more detail below with respect to FIG. 3. The displaced laser beams after passing through the beam refraction assembly 44 are indicated in the figures by reference numeral 38a. The triangular arrangement of laser beams 38a are passed through a focusing lens 46 (see FIG. 2) that focuses the laser beams into a single focus spot 48. In the preferred embodiment, the focusing lens 46 has a focal length of approximately 0.8 inches and is positioned approximately one inch or less from the beam refraction assembly 44. Alternatively, the beam refraction assembly 44 and/or the focusing lens can be eliminated if a laser illuminator or beacon is desired.

In an alternate embodiment, the focusing lens 46 can be positioned at a distance from the beam refraction assembly 44 that is large enough to allow the laser beams 38a to overlap by diffraction, which distance in one embodiment is approximately 30 inches. The distance may be decreased while still allowing the laser beams to overlap by employing a known beam expander or reverse telescope which causes the beams to overlap at a shorter distance from the beam refraction assembly, e.g., 5 inches. By allowing the laser beams to overlap, the focusing lens can be a slower, less expensive lens with less critical focus. The focusing lens focuses the overlapped laser beams to a cluster of closely spaced spots.

In general, the focusing lens 46 is positioned in the far field of the laser beams 38a when it is desired to allow the laser beams to overlap before they are focused. When it is desired to focus the laser beams without allowing them to overlap, then the focusing lens is positioned in the near field of the laser beams. As is known in the art, the near field is defined as the area between the resonator and the point defined by $D^2/\lambda$, where D is the cross-sectional diameter of one of the resonator cavities and $\lambda$ equals the wavelength of the laser beams and the far field is that area external to the near field.

Shown in detail in FIG. 3 is the beam refraction assembly 44 which includes three refracting elements, which are referred to herein as left 50, center 52, and right 54 refracting elements. Each refracting element has parallel refracting faces and is angled non-perpendicularly with respect to the laser beams 38 as received from the partially reflective resonator mirror 42 (FIG. 2). The laser beams 38 exit the output resonator mirror 42 in a substantially linear configuration as shown in FIG. 3a. The center refracting element 52 displaces the center laser beam downward to form the non-linear configuration shown in FIG. 3b. Then, the left and right refracting elements 50, 54 displace the outside laser beams toward each other to form the triangular arrangement of laser beams shown in FIG. 3c. The triangular arrangement of laser beams leaving the refractive elements 50, 52, 54 travels substantially in the same direction as the linear arrangement of laser beams 38 travels to the refractive elements. In a preferred embodiment, the refracting elements 50, 52, 54 are angled approximately 45 degrees with respect to the laser beams 38, with the left and right refracting elements 50, 54 being angled with respect to a vertical axis and the center refracting element being angled with respect to a horizontal axis.

The smaller, triangular arrangement of laser beams 38a allows the laser beams 38 to be focused to a smaller focus spot 48 than would be possible with the same focusing lens 46 (FIG. 2) operating on the larger undisplaced linear array of laser beams. Conversely, if a larger focus spot or a cluster of spots can be tolerated, a less expensive, slower focusing lens can be employed. Such a slower focusing lens makes focusing less critical by increasing the F number of the lens as is known in the art.

It should be noted that the arrangement of parallel laser beams 38 as described herein is inherently simpler than serial (folded) laser beams and does not have as much turnaround loss as folded laser beams. Further, losses are lower since the alignment of reflective resonator mirrors 40 and 42 is less complicated and can feature closer spacing to the resonator cavities 34, thereby limiting diffraction losses. Since the resonator cavities 34 are ideally closely spaced, electrical excitation is more compact and has less capacitance, making operation at higher frequencies possible. It has been found that using very thin bore separators 30 to create the independent resonator cavities 34 provides effective gas cooling and does not significantly change the volume of laser gas 14 available.

Figure 2:
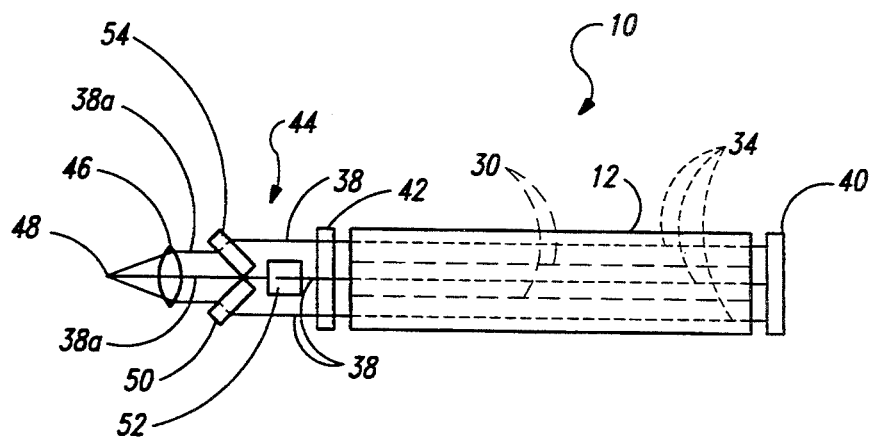
FIG. 2 is a schematic side elevational view of a gas laser system including optical elements according to a first embodiment of the present invention.
Figure 3A:
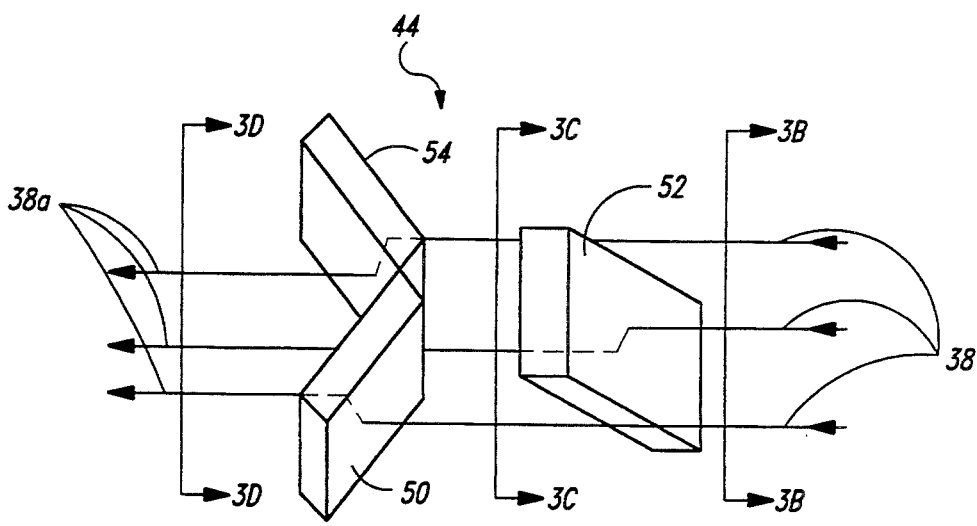
FIG. 3a is a cross-sectional view of the laser beams taken along line A—A of FIG. 3.
Figure 3B:
FIG. 3b is a cross-sectional view of the laser beams taken along line B—B of FIG. 3.
Figure 3C:
FIG. 3c is a cross-sectional view of the laser beams taken along line C—C of FIG. 3.
Figure 3D:
FIG. 3 is an enlarged isometric view of extra-cavity laser beam displacing elements employed in the laser system shown in FIG. 2.
Figure 4:
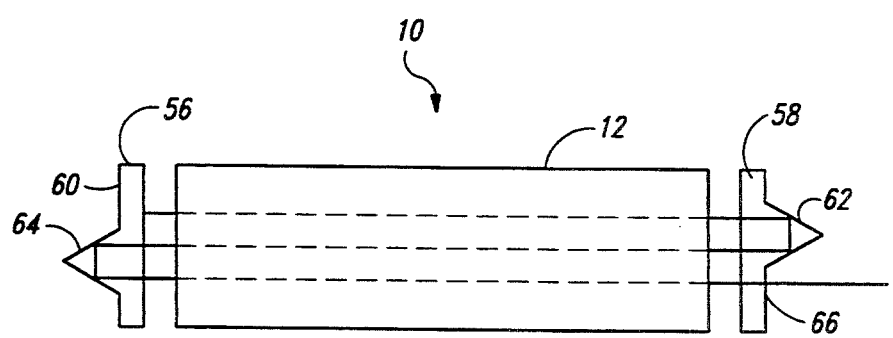
FIG. 4 is a top plan view of a gas laser system including resonator mirrors according to a second embodiment of the present invention.

In an alternate embodiment shown in a top plan view in FIG. 4, all elements of the gas laser 12 are identical to the elements shown in FIGS. 1-3, except that the planar resonator mirrors 40, 42 (FIG. 2) are replaced by first and second combination resonator mirrors 56, 58. For clarity, FIG. 4 shows only one of the three laser beams 38. The first combination resonator mirror 56 includes a totally reflective (99.8% reflective) planar section 60 that reflects each of the laser beams 38 to the second combination resonator mirror 58. The second combination resonator mirror 58 includes a folding roof mirror section 62 that receives the laser beams from the planar section of the first combination resonator mirror 56 and folds the laser beams by displacing and reflecting them back to the first combination resonator mirror. The first combination resonator mirror also includes a folding mirror section 64 that folds the folded laser beams to the second combination resonator mirror. The second combination resonator mirror includes a partially reflective (95% reflective) planar section 66 which allows a portion of each of the twice-folded laser beams to pass through and reflects the remainder. Each of the combination resonator mirrors 56, 58 can be made of a single optical substrate using conventional techniques and materials, such as zinc selenide, and are of sufficient size to cover all three of the resonator cavities 34. Well-known optical coatings, such as anti-reflection coatings, can be added to appropriate sections of the combination resonator mirrors to make the sections more or less reflective as desired. Folding each of the laser beams 38 before outputting them creates more desired diffraction-limited laser beams. The embodiment shown in FIG. 4 preferably is used for relatively long discharge gaps 18 where folding loss can be more easily tolerated.

Those having skill in the art to which the present invention pertains will now perceive as a result of what has been taught various modifications and additions. By way of example, such modifications may include laser beam arrays other than three and different beam rearrangers. They may also include different means of extracting heat or cooling the laser gas. It is also possible to visualize bore separators made from metals having small gaps to prevent shorting the electric fields. However, any such modifications are deemed to be within the scope of the invention, which is only limited by the claims appended hereto.

I claim:

1. A gas laser comprising:

an elongated laser housing enclosing a supply of laser gas;

an elongated first electrode surface extending longitudinally within the laser housing, and positioned toward a first side of the laser housing;

an elongated second electrode surface extending longitudinally within the laser housing parallel to and facing the first electrode surface, and positioned toward a second side of the laser housing opposite the first side, the first and second electrode surfaces defining an elongated first resonator cavity therebetween;

an elongated third electrode surface extending longitudinally within the laser housing, the third electrode surface being positioned toward the first side of the laser housing edgewise adjacent to the first electrode surface;

an elongated fourth electrode surface extending longitudinally within the laser housing parallel to and facing the third electrode surface, the fourth electrode surface being positioned toward the second side of the laser housing edgewise adjacent to the second electrode surface, the third and fourth electrode surfaces defining an elongated second resonator cavity therebetween;

an elongated separator extending longitudinally within the laser housing and extending laterally within the laser housing to separate the first and second resonator cavities, the separator having a lengthwise edge portion positioned between the first and third electrode surfaces and an opposite lengthwise edge portion positioned between the second and fourth electrode surfaces, the separator being electrically insulating but thermally conducive to electrically isolate the first and second resonator cavities from each other; and an electric field source generating an electric field between the first and second electrode surfaces and between the third and fourth electrode surfaces sufficient to create a first laser beam in the first resonator cavity and a second laser beam in the second resonator cavity.

2. The gas laser according to claim 1 wherein the first and third electrode surfaces are part of a single first electrode and the second and fourth electrode surfaces are part of a single second electrode.

3. The gas laser according to claim 2, further including at least one electrically insulating and thermally conducting elongated end block extending longitudinally within the laser housing, the end block extending laterally between either the first and second electrode surfaces or the third and fourth electrode surfaces to define either the first or second resonator cavity, respectively, between end block and the separator.

4. The gas laser according to claim 2, further including:

an elongated fifth electrode surface extending longitudinally within the laser housing, and positioned toward the first side of the laser housing edgewise adjacent to the third electrode surface;

an elongated sixth electrode surface extending longitudinally within the laser housing parallel to and facing the fifth electrode surface, and positioned toward the second side of the laser housing edgewise adjacent to the fourth electrode surface, the fifth and sixth electrode surfaces defining an elongated third resonator cavity therebetween; and a second separator extending longitudinally within the laser housing and extending laterally within the laser housing to separate the second and third resonator cavities, the second separator having a lengthwise edge portion positioned between the third and fifth electrode surfaces and an opposite lengthwise edge portion positioned between the fourth and sixth electrode surfaces, the second separator being electrically insulating but thermally conductive to electrically isolate the second and third resonator cavities from each other; and wherein the electric field source generates an electric field between the fifth and sixth electrode surfaces sufficient to create a third laser beam in the third laser cavity.

5. The gas laser according to claim 4, further including electrically insulating and thermally conductive elongated first and second end blocks extending longitudinally .within the laser housing, the first end block extending laterally between the first and second electrode surfaces to define the first resonator cavity between the first end block and the first separator, the second end block extending laterally between the fifth and sixth electrode surfaces to define the third resonator cavity between the second end block and the second separator.

6. The gas laser according to claim 4 wherein the first, second, and third laser beams are directed substantially in a first direction, and further including optical repositioning means located outside the first resonator cavity to laterally displace the first laser beam toward the third laser beam while maintaining the first laser beam upon exit from the optical repositioning means substantially in the first direction.

7. The gas laser according to claim 6 wherein the optical repositioning means includes a refractive element having parallel faces with an angle of incidence to the first laser beam other than zero degrees.

8. The gas laser according to claim 6, further including a focusing element positioned to receive and focus the displaced first, second, and third laser beams.

9. The gas laser according to claim 1, further including common resonator optics used for both the first and second laser beams.

10. The gas laser according to claim 9 wherein the common resonator optics include a planar mirror and a folding mirror for folding the first and second laser beams.

11. The gas laser according to claim 10 wherein the folding mirror and planar mirror are manufactured of a single optical substrate.

12. The gas laser according to claim 1 wherein the electric field source provides a radio frequency discharge between the first and second electrode surfaces.

13. A gas laser comprising:

an elongated laser housing enclosing a supply of laser gas;

an elongated first electrode surface extending longitudinally within the laser housing;

an elongated second electrode surface extending longitudinally within the laser housing and facing the first electrode surface, the first and second electrode surfaces defining an elongated first resonator cavity therebetween;

an elongated third electrode surface extending longitudinally within the laser housing;

an elongated fourth electrode surface extending longitudinally within the laser housing, and facing the third electrode surface, the third and fourth electrode surfaces defining an elongated second resonator cavity therebetween;

an elongated separator extending longitudinally within the laser housing and separating the first and second resonator cavities, the separator electrically isolating the first and second resonator cavities from each other; and an electric field source generating an electric field between the first and second electrode surfaces and between the third and fourth electrode surfaces sufficient to create a first laser beam in the first resonator cavity and a second laser beam in the second resonator cavity.

14. A gas laser comprising:

an elongated laser housing enclosing a supply of laser gas;

an elongated first electrode extending longitudinally within the laser housing, the first electrode having an elongated first electrode surface extending longitudinally within the laser housing and an elongated second electrode surface extending longitudinally within the laser housing adjacent to the first electrode surface of the first electrode;

an elongated second electrode extending longitudinally within the laser housing, the second electrode having an elongated first electrode surface extending longitudinally within the laser housing parallel to and facing the first electrode surface of the first electrode, the pair of first electrode surfaces defining an elongated first resonator cavity therebetween, and an elongated second electrode surface extending longitudinally within the laser housing parallel to and facing the second electrode surface of the first electrode and adjacent to the first electrode surface of the second electrode, the pair of second electrode surfaces defining an elongated second resonator cavity therebetween;

an elongated separator extending longitudinally within the laser housing and extending laterally between the first and second electrodes to separate the first and second resonator cavities, the separator being in thermal contact with at least one of the first or second electrodes to transfer thermal energy thereto for cooling of the laser gas in the first and second resonator cavities, the separator being electrically insulating but thermally conducive to electrically isolate the first and second resonator cavities from each other, the laser gas being in fluid communication with both the first and second resonator cavities; and an electric field source generating an electric field between the first and second electrodes to create a first laser beam in the first resonator cavity and a second laser beam in the second resonator cavity.

15. A gas laser comprising:

a laser housing enclosing a supply of laser gas;

an elongated first electrode extending longitudinally within the laser housing;

an elongated second electrode extending longitudinally within the laser housing and spaced apart from the first electrode;

first and second insulating members, each extending between the first and second electrodes to form a rectangular discharge section;

at least one elongated separator extending longitudinally within the laser housing and extending laterally between the first and second electrodes to divide the discharge section into at least first and second resonator cavities; and an electric field source applying an electric radio-frequency field between the first and second electrodes sufficient to create a first laser beam in the first resonator cavity and a second laser beam in the second resonator cavity.

16. The gas laser according to claim 15, further including common resonator optics used for both the first and second laser beams.

17. The gas laser according to claim 15, further including:

a second separator extending longitudinally within the laser housing and extending laterally between the first and second electrodes to further divide the discharge section into a third resonator cavity wherein the electric field source creates a third laser beam in the third resonator cavity.

18. The gas laser according to claim 17, further including optical repositioning means located outside the resonator cavities to laterally displace the first laser beam toward the second laser beam while maintaining the direction of the first laser beam upon exit from the optical repositioning means substantially unchanged from the direction of the first laser beam before entering the optical repositioning means.

19. The gas laser according to claim 18 wherein the optical repositioning means includes a refractive element having parallel faces with an angle of incidence to the first laser beam other than zero degrees.

20. The gas laser according to claim 18, further including a focusing element positioned to receive and focus the displaced first, second, and third laser beams.

21. The gas laser according to claim 15, further including optical folding means for forming the first and second resonator cavities into folded laser cavities.

* * * * *